US012715055B2

(12) United States Patent
Smith

(10) Patent No.: US 12,715,055 B2
(45) Date of Patent: Aug. 25, 2026

(54) APPARATUS FOR DETERMINING THE ROLL, PITCH AND YAW OF A KEY BLANK

(71) Applicant: Iconx International Limited, Manchester (GB)

(72) Inventor: Ian Simon Smith, Keighley (GB)

(73) Assignee: ICONX INTERNATIONAL LIMITED, Manchester (GB)

( * ) Notice: Subject to any disclaimer, the term of this patent is extended or adjusted under 35 U.S.C. 154(b) by 644 days.

(21) Appl. No.: 18/300,048

(22) Filed: Apr. 13, 2023

(65) Prior Publication Data

US 2024/0342809 A1 Oct. 17, 2024

(51) Int. Cl.
*B23C 3/35* (2006.01)

(52) U.S. Cl.
CPC ............ *B23C 3/35* (2013.01); *B23C 2235/12* (2013.01); *B23C 2235/32* (2013.01); *B23C 2255/04* (2013.01)

(58) Field of Classification Search
CPC ... B23C 3/35; B23C 2235/12; B23C 2235/32; B23C 2255/04; G05B 2219/45245; G05B 19/401; G05B 19/4086
See application file for complete search history.

(56) References Cited

U.S. PATENT DOCUMENTS

| | | | | |
|---|---|---|---|---|
| 5,908,273 | A * | 6/1999 | Titus | B23C 3/35 409/83 |
| 5,997,224 | A | 12/1999 | Beauregard et al. | |
| 11,768,069 | B2 * | 9/2023 | Pigatti | G01B 11/24 356/601 |
| 2004/0024486 | A1 * | 2/2004 | Almblad | B23C 3/35 700/95 |
| 2007/0224008 | A1 * | 9/2007 | Bass | G06V 10/60 409/81 |
| 2011/0164938 | A1 * | 7/2011 | Bass | G06V 10/145 409/81 |
| 2016/0377408 | A1 * | 12/2016 | Gardner, Jr. | B23C 3/35 356/72 |

FOREIGN PATENT DOCUMENTS

| | | | |
|---|---|---|---|
| CN | 109794728 | A * | 5/2019 |
| EP | 0799105 | B1 | 3/2005 |
| EP | 3519766 | B1 | 11/2020 |

OTHER PUBLICATIONS

Extended European Search Report for EP Patent Application No. 24169382.9 dated Sep. 10, 2024 (10 pages).

* cited by examiner

*Primary Examiner* — Christopher E. Everett
(74) *Attorney, Agent, or Firm* — ALSTON & BIRD LLP

(57) ABSTRACT

An apparatus comprising: at least one processor, and at least one memory including computer program code configured to, with the at least one processor, cause the apparatus at least to: determine a roll, a pitch and a yaw of a clamped key blank; and based at least in part on the determined roll, pitch and yaw of the key blank, determine a cutting sequence for cutting the key blank.

19 Claims, 11 Drawing Sheets

APPARATUS FOR DETERMINING THE ROLL, PITCH AND YAW OF A KEY BLANK

TECHNICAL FIELD

Examples of the disclosure relate to an apparatus for determining the roll, pitch and yaw of a key blank.

BACKGROUND

Keys come in a variety of shapes and sizes. It may be desirable to replicate a particular (master) key. Replication involves determining an appropriate key blank to cut, determining how to cut the key blank, and then cutting the selected key blank.

BRIEF SUMMARY

According to various, but not necessarily all, examples there is provided an apparatus comprising: at least one processor; and at least one memory including computer program code configured to, with the at least one processor, cause the apparatus at least to: determine a roll, a pitch and a yaw of a clamped key blank; and based at least in part on the determined roll, pitch and yaw of the key blank, determine a cutting sequence for cutting the key blank.

The computer program code may be configured to, with the at least one processor, further cause the apparatus at least to: cause at least one cutter to cut the key blank in accordance with the determined cutting sequence.

The roll may represent an orientation about a first dimension in a reference frame of the apparatus, the pitch may represent an orientation about a second dimension in the reference frame of the apparatus and the yaw may represent an orientation in a third dimension in the reference frame of the apparatus.

The computer program code may be configured to, with the at least one processor, cause the apparatus at least to: determine two or more locations of the key blade in the second dimension; and based at least in part on the determined two or more locations, determine the roll of the clamped key blank.

The computer program code may be configured to, with the at least one processor, cause the apparatus at least to: determine two or more locations of the key blade in the first dimension; and based at least in part on the determined two or more locations, determine the yaw of the clamped key blank.

The computer program code may be configured to, with the at least one processor, cause the apparatus at least to: determine two or more locations of the key blade in the third dimension; and based at least in part on the determined two or more locations, determine the pitch of the clamped key blank.

The computer program code may be configured to, with the at least one processor, cause the apparatus at least to: determine an extent of the clamped key blank in at least one of the first, second and third dimensions.

The computer program code may be configured to, with the at least one processor, cause the apparatus at least to: cause relative movement of the clamped key blank and a probe when determining at least one of the roll, pitch and yaw.

The computer program code may be configured to, with the at least one processor, cause the apparatus at least to: determine a cutting code, wherein the cutting sequence is determined at least in part on the determined cutting code.

The computer program code may be configured to, with the at least one processor, cause the apparatus at least to: based on the cutting code, determine a cutting extent for each of a plurality of cuts that are associated with the cutting code; and based on the determined roll, pitch and yaw, adjusting at least one of the cutting extents.

Each cutting extent may comprise a cutting extent in at least one of the first, second or third dimension.

The computer program code may be configured to, with the at least one processor, cause the apparatus at least to: based on the cutting code, determine a cutting extent in at least one of the first, second or third dimension; and based on the determined roll, adjusting the determined cutting extent.

The computer program code may be configured to, with the at least one processor, cause the apparatus at least to: determine a first of roll, pitch or yaw; determine a second of roll, pitch and yaw that is different from the first; determine a third of roll, pitch and yaw that is different from the first and second; after determining the roll, pitch and yaw, adjusting the cutting extent based on the determined third, subsequently based on the determined second and finally based on the determined first.

The first may be the yaw. The second may be the pitch. The third may be the roll.

The apparatus may comprise a probe having a generally planar surface. The generally planar surface may define a plane substantially parallel to the second dimension and the third dimension. The probe may comprise at least one protrusion.

The apparatus may be a key cutting machine. The key cutting machine may comprise a key clamp for clamping the key blank and the at least one cutter.

According to various, but not necessarily all, examples there is provided a non-transitory computer readable medium comprising program instructions for causing an apparatus to perform at least the following: determining a roll, a pitch and a yaw of a clamped key blank; and based at least in part on the determined roll, pitch and yaw of the key blank, determine a cutting sequence for cutting the key blank.

According to various, but not necessarily all, examples there is provided a computer-implemented method comprising: determining a roll, a pitch and a yaw of a clamped key blank; and based at least in part on the determined roll, pitch and yaw of the key blank, determining a cutting sequence for cutting the key blank.

According to various, but not necessarily all, examples there is provided examples as claimed in the appended claims.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which.

Figures 1A, 1B:
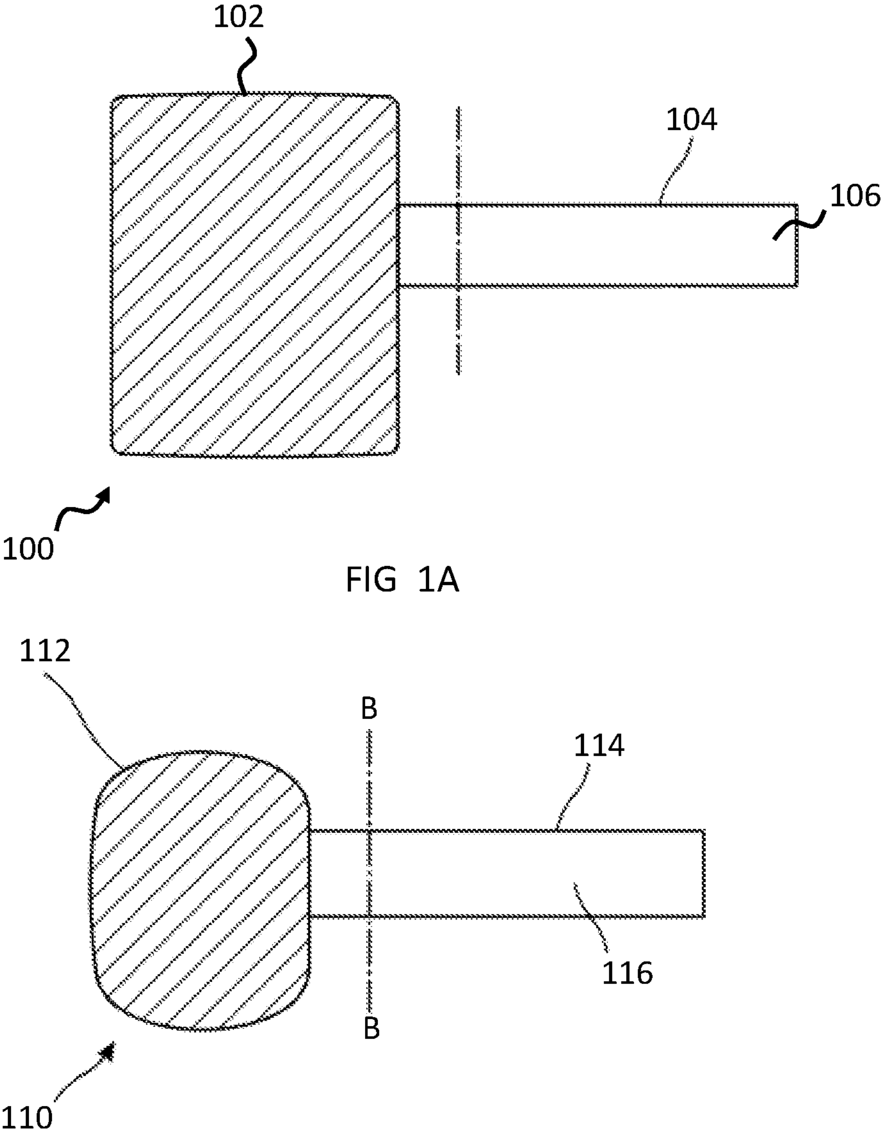
FIG. 1A illustrates an elevation of a high security key blank.
FIG. 1B illustrates an elevation of a dimple key blank.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

DETAILED DESCRIPTION

When cutting a key blank, the key blank may be clamped in order to prevent or reduce the movement of the key blank whilst the key blank is being cut. Determining the orientation of a clamped key blank in accordance with embodiments of the invention, such as the roll, pitch and yaw of the clamped key blank, can improve the accuracy of the cut of the key blank.

Many different types of key (and therefore many different types of key blank) exist. Some examples of key blanks are illustrated in FIGS. 1A and 1B. FIG. 1A illustrates an elevation of a high security key blank 100 and FIG. 1B illustrates an elevation of a dimple key blank 110.

FIG. 1A illustrates a high security key blank 100, such as an automotive or residential key blank. The high security key blank 100 comprises a head 102 and a blade 104. The head 102 may be made from a plastics material and may have a much greater depth than the blade 104. The blade 104 of the high security key blank 100 is a rectangular prism shape.

Figure 1C:
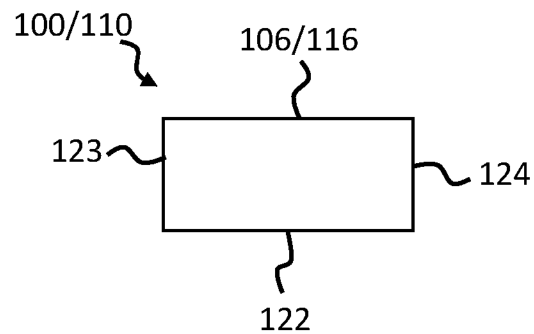
FIG. 1C illustrates a cross section of the high security key blank or the dimple key blank illustrated through the line A-A or B-B illustrated in FIG. 1A or FIG. 1B.

FIG. 1C illustrates a cross section of the blade 104 through the line A-A illustrated in FIG. 1A. The cross section of the blade 104 is substantially rectangular. The blade 104 comprises an upper surface 106, a lower surface 122, a first side surface 123 and a second side surface 124. The upper and lower surfaces 106, 122 may be defined by the length and width of the blade 104. The first and second side surfaces 123, 124 may be defined by the length and the depth of the blade 104. The high security key blank 100 is cut by cutting a track into the upper surface 106 of the blade 104 and/or a lower surface 122 of the blade 104.

FIG. 1B illustrates an example of a dimple key blank 110. The dimple key blank 110 comprises a head 112 and a blade 114. The head 112 may be made from a plastics material and may have a much greater depth than the blade 114. The blade 114 of the dimple key blank 110 is a rectangular prism shape.

FIG. 1C illustrates the cross section of the blade 114 through the line B-B illustrated in FIG. 1B. The cross section of the blade 114 is substantially rectangular. The blade 114 comprises an upper surface 116, a lower surface 122, a first side surface 123 and a second side surface 124. The upper and lower surfaces 116, 122 may be defined by the length and width of the blade 114. The first and second side surfaces 123, 124 may be defined by the length and the depth of the blade 114. The dimple key blank 110 is cut by cutting cone-shaped dimples into the upper surface 116 of the blade 114 and/or the lower surface 122 of the blade 114.

It will be appreciated from the above description that keys and key blanks come in many different shapes and sizes. Indeed, there are a number of other different key types beyond those that are illustrated in FIGS. 1A and 1B.

Figure 1D:
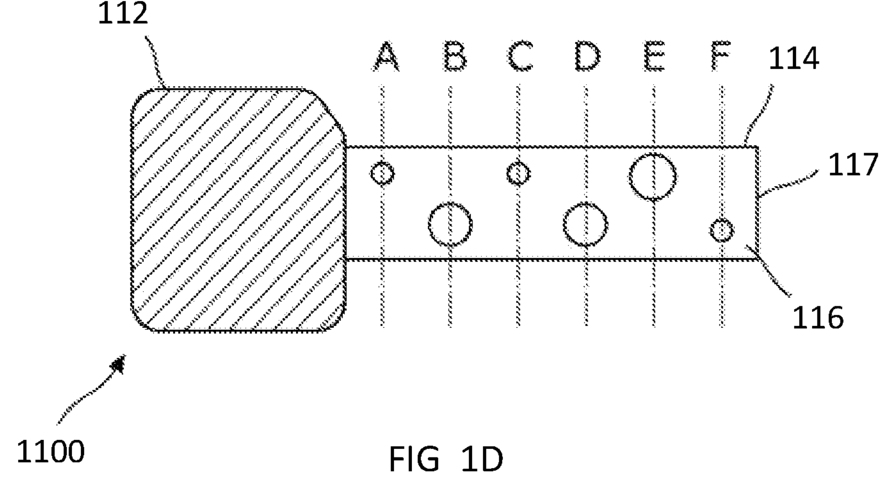
FIG. 1D illustrates an example of a dimple key cut from the dimple key blank illustrated in FIGS. 1B and 1C.

FIG. 1D illustrates an example of a dimple key 1100 cut from the dimple key blank 110 illustrated in FIG. 1B. The blade 114 of the dimple key 1100 is the functional part of the key when the key is placed into a lock in order to lock or unlock the lock. The dimple key 1100 has been cut by cutting dimples (dome-shapes) into the upper surface 116 of the key blade 114 at a plurality of predefined positions A-F along the length of the blade 114. The positions are known as "spacings" and are set by the manufacturer of the key.

The positions/spacings A-F may be defined from the tip 117 of the key 1100. The tip 117 of the key 1100 is located at the opposite end of the blade 114 from the head 112 along the length of the blade 114. It is the extremity of the blade 114. Alternatively, the positions/spacings may be defined from a shoulder/stop near the head 112 of the key 1100. The shoulder/stop of the key 1100 is a portion of the key 1100 that limits the extent to which the blade 114 may enter a lock before it can go no further. The shoulder/stop abuts a portion of the lock to prevent the blade 114 from entering further. In some instances, the positions/spacings may be defined from a "virtual shoulder/position" near the head 112. The position of the (virtual) shoulder/stop is a known distance in the length dimension from the tip 117 of the blade 114.

The location and/or size of the dimple cut at each of the locations A-F is set by a particular code. Each alphanumeric character in the code may correspond to a dimple cut of a particular size at a particular spacing along the length dimension of the blade 114, and/or may correspond to the position of the dimple cut in the blade 244. The plurality of predefined positions/spacings A-F can be considered to be "decoding positions" in that the code for the key 1100 can be determined by determining the size of the dimple cut and/or the position of the dimple cut at each spacing.

In other examples, the key might not be a dimple key 1100 and therefore the cuts might not be dimple cuts. The cuts might be discrete cuts into the upper surface of the blade 114, as is the case with the dimple key 1100, or there might instead be a single continuous cut.

Figure 1E:
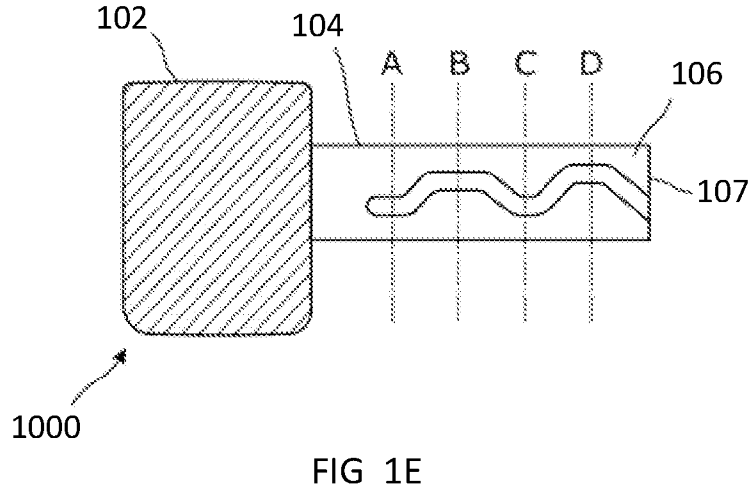
FIG. 1E illustrates an example of a high security key cut from the high security blank illustrated in FIGS. 1A and 1C.

FIG. 1E illustrates an example of a high security key cut 1000 from the high security blank 100 illustrated in FIG. 1A. The illustrated high security key 1000 is an example of a key in which there is a single continuous cut. The high security key 1000 has been cut by cutting a continuous track into the upper surface 116 (e.g., by milling). In this example, there are four positions/spacings A-D, where a position of the cut at a particular spacing corresponds with a particular alphanumeric character in the code that defines the key 1000. In other examples, the key might not be a dimple key 1100 or a high security key 1000 as illustrated in FIGS. 1A and 1B. It might, for example, be an edge cut key, tibbe key or an AVA key. It should be appreciated that the blades of different types of keys might be symmetrical or non-symmetrical. It should also be appreciated that the cross-sectional shape of different types of keys might be symmetrical or non-symmetrical.

Figure 2:
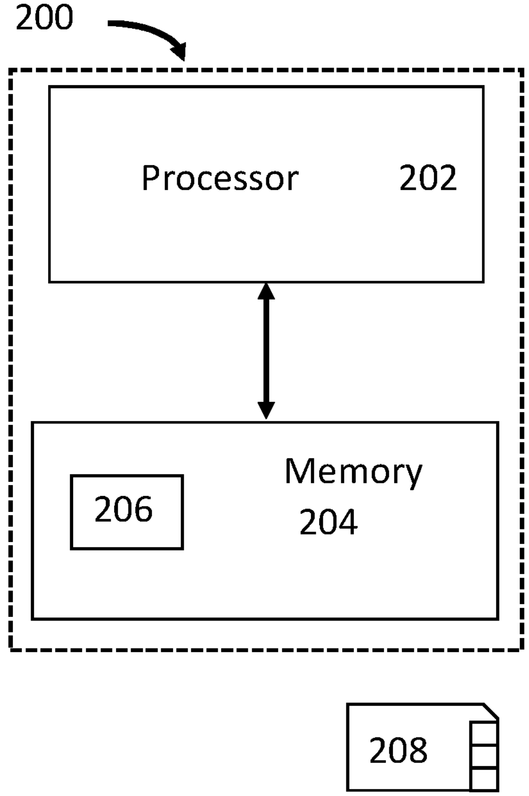
FIG. 2 illustrates a schematic of an apparatus.

FIG. 2 illustrates a schematic of an apparatus 200. The apparatus 200 may, for example, be a chipset. The illustrated apparatus 200 comprises at least one processor/processing circuitry 202 and at least one memory 204.

The processor 202 is configured to read from and write to the memory 204. The processor 202 may also comprise an output interface via which data and/or commands are output by the processor 202 and an input interface via which data and/or commands are input to the processor 202.

The memory 204 stores a computer program 206 comprising computer program instructions (computer program code) that controls the operation of the apparatus 200 when loaded into the processor 202. The computer program instructions, of the computer program 206, provide the logic and routines that enables the apparatus to perform the methods illustrated in the accompanying FIGS. 5 and 7. The processor 202 by reading the memory 204 is able to load and execute the computer program 206.

As illustrated in FIG. 2, the computer program 206 may arrive at the apparatus 200 via any suitable delivery mechanism 208. The delivery mechanism 208 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 206. The delivery mechanism may be a signal configured to reliably transfer the computer program 206. The apparatus 200 may propagate or transmit the computer program 206 as a computer data signal.

The computer program instructions may be comprised in a computer program, a non-transitory computer readable medium, a computer program product, a machine readable medium. In some but not necessarily all examples, the computer program instructions may be distributed over more than one computer program.

Although the memory 204 is illustrated as a single component/circuitry it may be implemented as one or more separate components/circuitry some or all of which may be integrated/removable and/or may provide permanent/semi-permanent/dynamic/cached storage.

Although the processor 202 is illustrated as a single component/circuitry it may be implemented as one or more separate components/circuitry some or all of which may be integrated/removable. The processor 202 may be a single core or multi-core processor.

Figure 3:
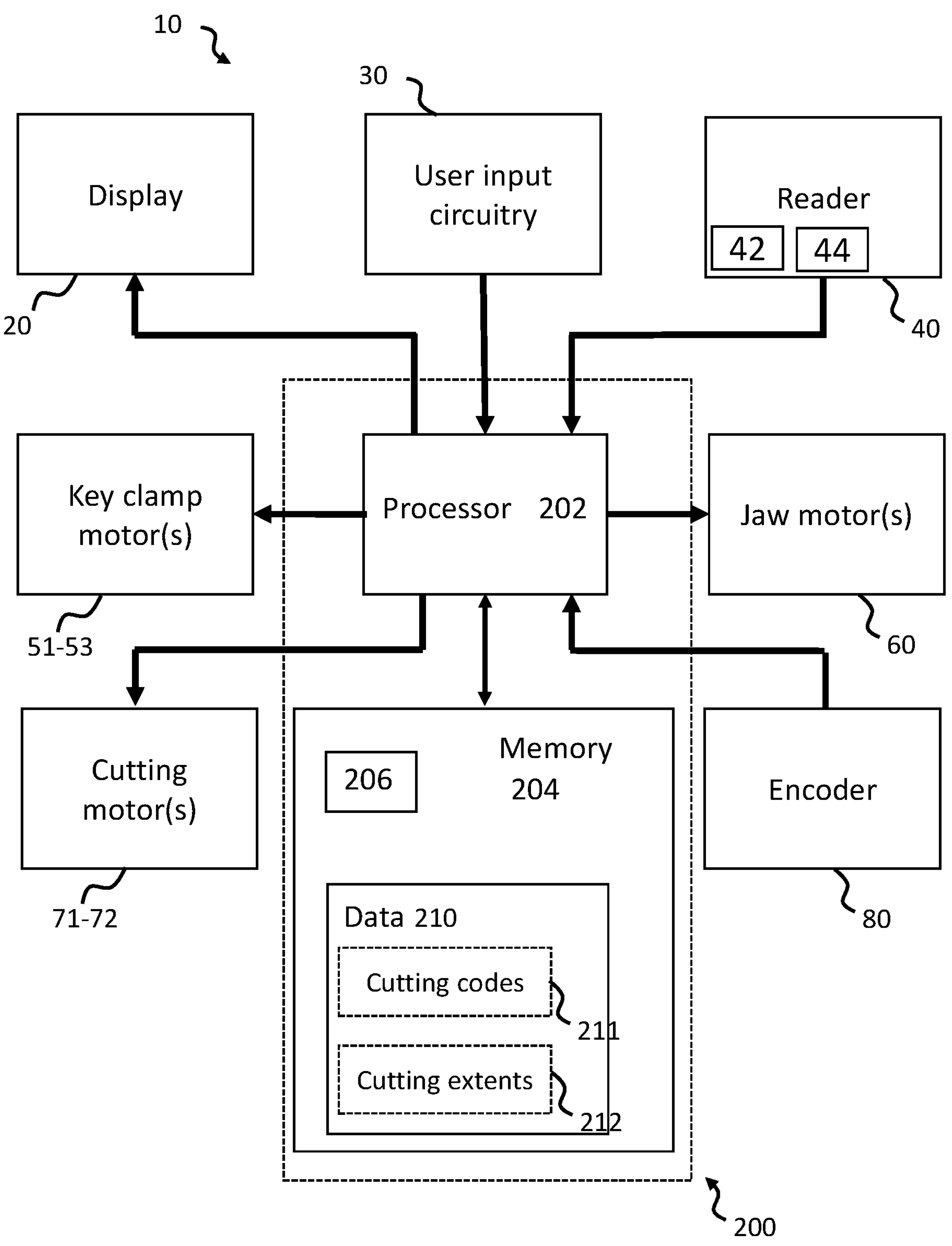
FIG. 3 illustrates a schematic of an apparatus.

FIG. 3 illustrates a schematic of an apparatus 10. The apparatus 10 illustrated in FIG. 3 may, for example, be a key cutting machine 10. The illustrated key cutting machine 10 may replicate keys for users in an automated manner The key cutting machine 10 illustrated in FIG. 3 comprises the apparatus/chipset 200 illustrated in FIG. 2. The key cutting machine 10 further comprises a display 20, user input circuitry 30, a reader 40, key clamp motor(s) 51-53, jaw motor(s) 60, cutting motor(s) 71, 72 and an encoder 80.

Each of the elements 20, 30, 40, 51-53, 60, 71, 72, 80, 200 are operationally coupled and any number or combination of intervening elements can exist (including no intervening elements). For example, additional electrical circuitry may be present between the processor 202 and each motor 51-53, 60, 71, 72 to enable the processor 202 to drive each motor 51-53, 60, 71, 72.

The display 20 is an electronic display which may comprise an array of pixels formed in rows and columns. The display 20 can be any type of electronic display, including a liquid crystal display (LCD) and an organic light emitting diode (OLED) display. The processor 202 is configured to provide outputs to the display 20 to control content that is displayed by the display 20.

The user input circuitry 30 is configured to receive inputs from a user of the key cutting machine 10. The user may be a person that wishes to have a key blank cut to replicate an existing (master) key. The user input circuitry 30 might, for example, comprise one or more keys and/or one or more buttons. In some embodiments, some or all of the user input circuitry 30 might be integrated with the display 20 in a touch sensitive display.

The reader 40 is configured to scan a (master) key. The reader 40 might, for example, comprise a camera 42. The camera 42 may be a digital camera that includes an image sensor, such as a charge coupled device (CCD) or a complementary metal oxide semiconductor (CMOS) sensor. The camera 42 may be controlled by the processor 202 and is configured to provide images to the processor 202. Each image may be in the form of two-dimensional images formed of an array of pixels arranged in columns and rows. The camera 42 may be arranged to capture at least one image of a key.

The reader 40 might, for example, also comprise a light source 44. The light source 44 may be controlled by the processor 202. When the reader 40 scans a key, the processor 202 may control the light source 44 to emit a beam of light towards a key. The beam of light may comprise or consist of coherent light. In this regard, the light source 44 might be a laser. The beam of light provided by the light source 44 may enable the camera 42 to capture at least one image of a key. For instance, the beam of light might be reflected, at least in part, towards the camera 42 by the key. The image(s) might depict a two-dimensional profile of the key.

The camera 42 and/or the key 44 may comprise any of their respective features as described in WO 2021/156632 A2.

The key clamp motor(s) 51-53, the jaw motor(s) 60 and the cutting motor(s) 71, 72 are controlled by the processor 202. The processor 202 may control the key clamp motor(s) 51-53 to adjust a position of a key clamp. The processor 202 may control the jaw motor(s) 60 to adjust at least one jaw of the key clamp. The processor 202 may control the cutting motor(s) 60 to actuate one or more cutters configured to cut a key blank 100, 110. These are described in further detail below.

The encoder 80 is configured to provide orientation data of a clamped key blank 100, 110 to the processor 202. The orientation data may comprise the orientation of the clamped key blank 100, 110 relative to the key cutting machine 10. The processor 202 may determine a roll, a pitch and a yaw of the clamped key blank 100, 110 based at least in part on the orientation data. The encoder 80 may be any suitable type of encoder 80 such as an optical encoder, a magnetic encoder, or a resistive encoder. The optical encoder may comprise at least one camera and/or at least one light source. The resistive encoder may comprise at least one probe.

The memory 204 may store data 210. The data 210 may include, for example, cutting codes 211 and/or cutting extents 212. Each cutting code 211 may comprise at least one cut, a location of each cut and a cutting extent 212 for each cut. The cutting extents 212 may comprise an extent of a cut in a blade 104, 114 of a key 1000, 1100 in at least one of the width, height/depth and length of the blade 104, 114 of the key 1000, 1100. For example, with reference to the spacings in FIGS. 1D and 1E, a cutting code 211 may comprise a cut for each spacing A-F. The cutting location of a cut may be the location on the key blank 100, 110 at which the cutting extent is made. For example, a cutting location may be the location within a spacing A-F. The cutting extent for each cut may comprise the width, height/depth and length of the cut to made at each spacing A-F.

The processor 202 may determine the cutting code 211. For example, the processor 202 may receive a scan of a (master) key performed by the reader 40 and determine the cutting code 211 based on the scan. For example, the processor 202 may analyse the scan to determine characteristics of the key in order to enable the processor to determine a cutting code 211 for the key. For example, the processor 202 may determine the location and/or extent of cuts in the key at particular spacings to determine the cutting code 211. In this regard, the determined location and/or extent of the cuts may correspond with the location and/or extent of cuts in one of a plurality of stored cutting code 211 which represents a match for the key.

The one or more known cutting codes 211 may be stored in the memory 204 of the apparatus 10 (i.e., a local memory of the apparatus) and/or in a remote memory associated with the apparatus 10 (e.g., a server connected to the apparatus).

Additionally or alternatively, the cutting code 211 may be determined from information input by a user via the user input circuitry 30. For example, a user may select/enter a make, a model and registration number of a vehicle associated with a key 1000, 1100 and the known cutting code may be determined based on the inputs. In some examples, the user may merely enter the registration number of the vehicle and the processor 202 might determine the make and model (e.g., from the memory 204 or a remote memory such as the remote memory referenced above).

Figure 4A:
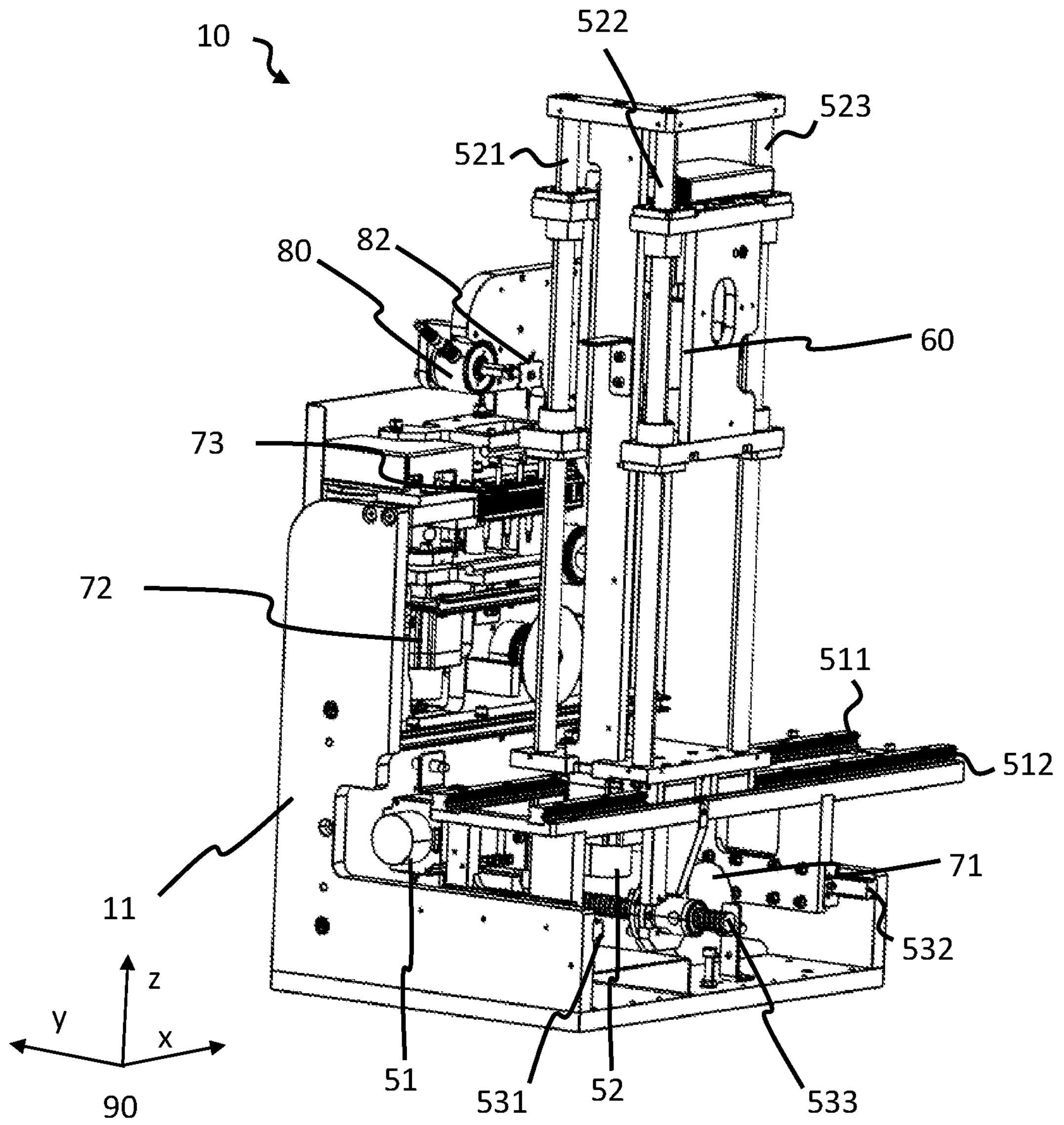
FIG. 4A illustrates a first front perspective view of a key cutting machine.
Figure 4B:
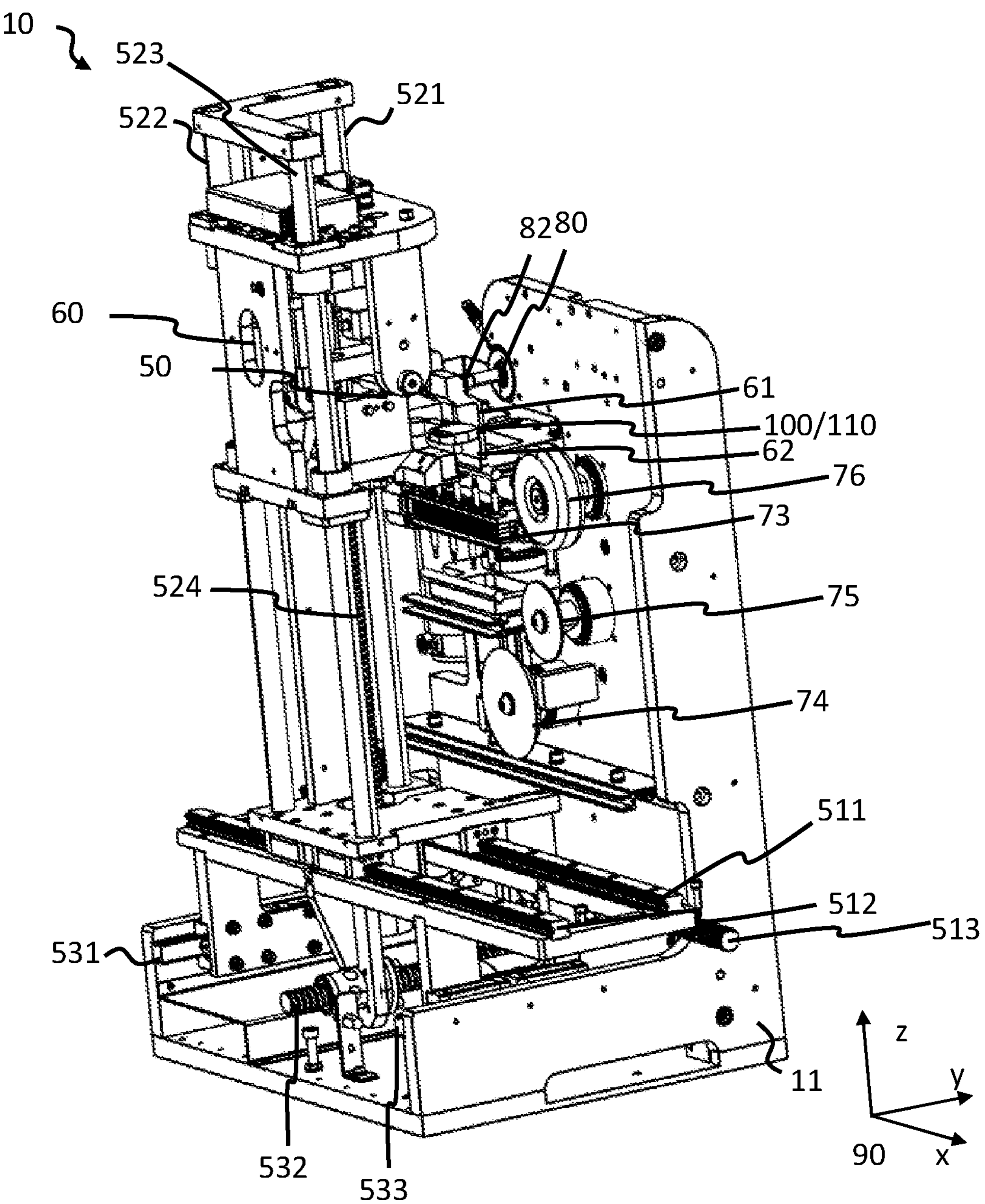
FIG. 4B illustrates a second front perspective view of the key cutting machine.
Figure 4C:
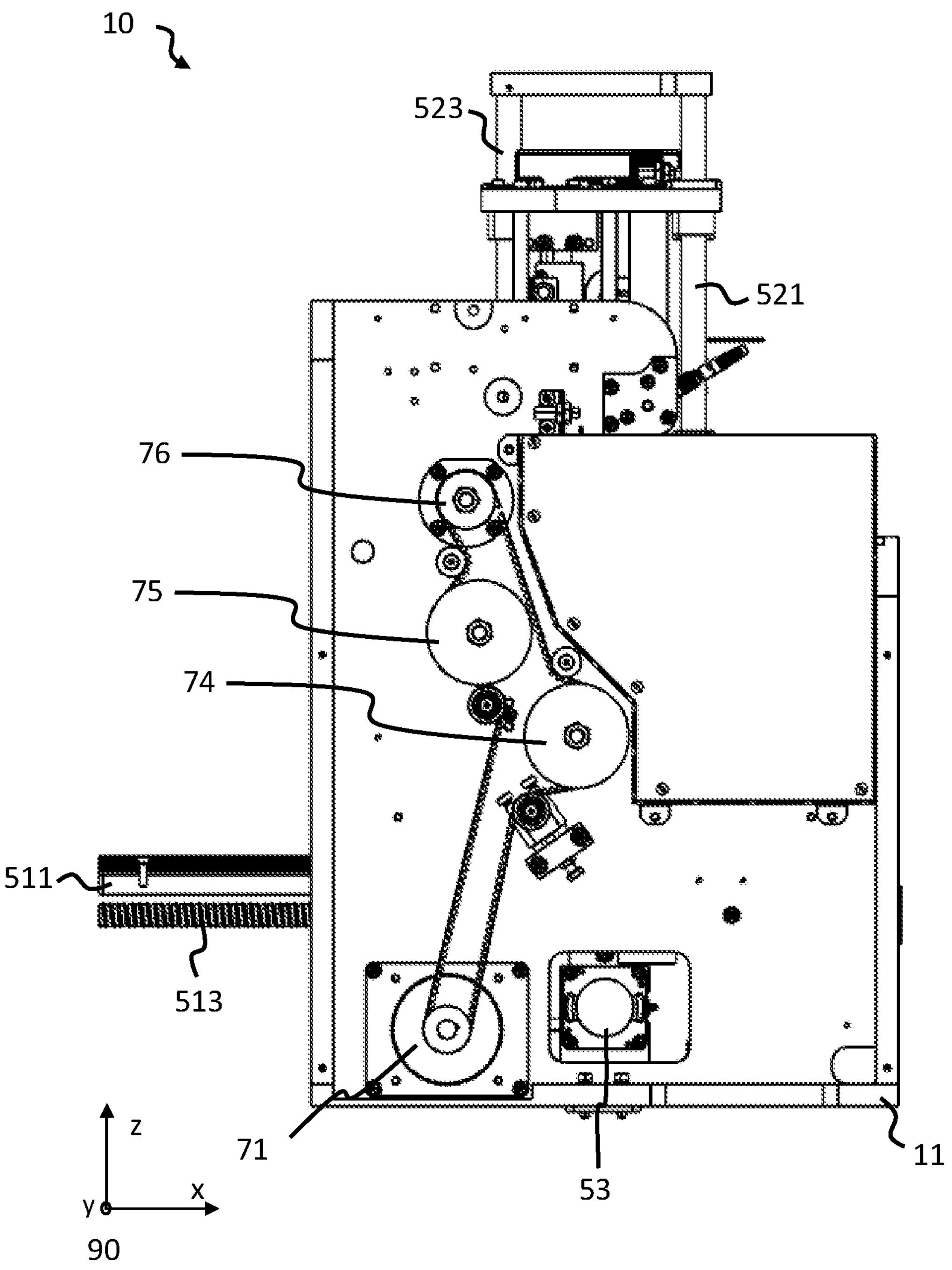
FIG. 4C illustrates a rear view of the key cutting machine.

FIGS. 4A, 4B and 4C illustrate a first front perspective view, a second front perspective view and a rear view of the key cutting machine 10 respectively. All of the FIGS. include Cartesian co-ordinate axes 90 to enable the reader to orientate the FIGS. relative to one another. The x-axis defines a width/lateral dimension, the y-axis defines a length/depth dimension and the z-axis defines a height/vertical dimension. Each of the dimensions is orthogonal to the others.

The roll of the clamped key blank may represent an orientation about a first dimension in a reference frame of the apparatus 10, 200. For example, the roll may represent an orientation about the length/depth dimension of the apparatus 10, 200.

The pitch of the clamped key blank may represent an orientation about a second dimension in the reference frame of the apparatus 10, 200. For example, the pitch may represent an orientation about the width/lateral dimension of the apparatus 10, 200.

The yaw may represent an orientation in a third dimension in the reference frame of the apparatus 10, 200. For example, the yaw may represent an orientation about the vertical dimension of the apparatus 10, 200.

The key cutting machine 10 comprises a support frame 11 to which other elements of the key cutting machine 10 are directly or indirectly mounted. The support frame 11 is best seen in FIGS. 4A-4C, where it can be viewed from various angles.

The key cutting machine 10 may comprise at least one of a key clamp 50, a first key clamp motor 51, a second key clamp motor 52, a third key clamp motor 53, a first set of rails 511-513, a second set of rails 521-524, a third set of rails 531-533, a jaw motor 60, a first cutting motor 71, a second cutting motor 72, one or more cutting instruments 73-76, an encoder 80 and a probe 82.

Figure 4D:
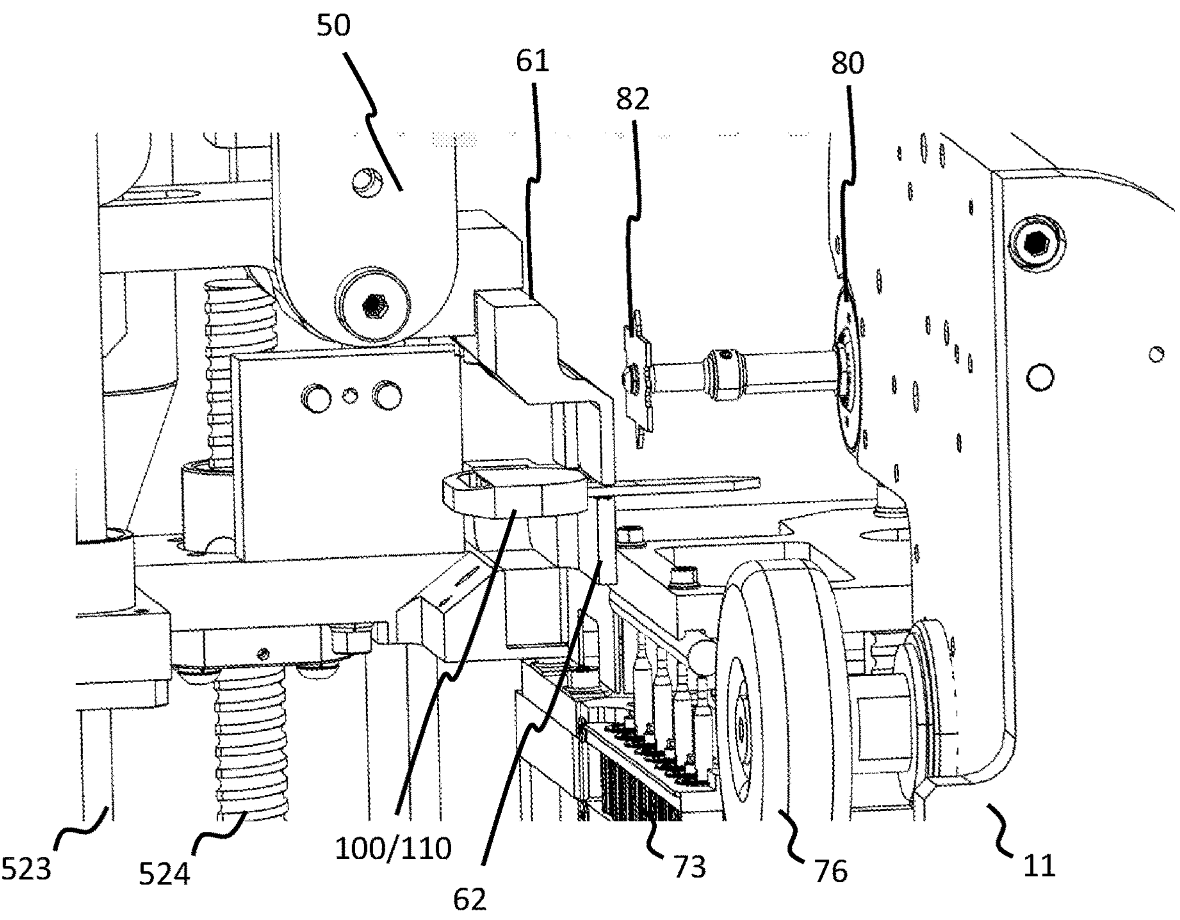
FIG. 4D illustrates a side perspective view of part of the key cutting machine.

FIG. 4D illustrates a side perspective view of part of the key cutting machine 10. The key clamp 50 (see FIGS. 4B and 4D) is for receiving and retaining a key blank 100, 110. As shown in FIG. 4D, the key clamp 50 may receive and retain a key blank 100, 110. For example, the key clamp 50 may receive and retain a key blank 100, 110 in order to enable it to be cut by the key cutting instruments 73-76. As shown in FIG. 4D, the key clamp 50 may comprise an upper jaw 61 and a lower jaw 62 for gripping a key blank 100, 110. For example, the jaws 61, 62 may grip a key blank 100, 110 by the head, the shank or the blade 104, 114 of the key blank 100, 110. In the illustrated example, the jaws 61,62 are gripping the key blank 100, 110 by the blade 104, 114. The jaw motor 60 is configured to cause relative motion of the jaws 61, 62 of the key clamp 50 in order to cause the key clamp 50 to grip and retain a key blank 100, 110, or to release a key blank 100, 110.

In embodiments of the invention, the key cutting machine 10 may be arranged to move the key clamp 50 in each of three orthogonal dimensions, enabling a key blank 100, 110 held by the key clamp 50 to be moved and therefore cut with very high precision. The first, second and third sets of rails 511-513, 521-524, 531-533 (as best seen in FIGS. 4A to 4C) may be arranged in different orthogonal dimensions to enable the key clamp to be moved in the three orthogonal dimensions. For example, the first set of rails 511-513 may be arranged to enable movement of the key clamp 50 in a first dimension, the second set of rails 521-524 may be arranged to enable movement of the key clamp 50 in a second dimension and the third set of rails 531-533 may be arranged to enable movement of the key clamp 50 in a third dimension.

The first set of rails 511-513 may be arranged to enable horizontal movement of the key clamp 50. The first key clamp motor 51 may be configured to cause the key clamp 50 to move in the horizontal dimension. The second set of rails 521-524 may be arranged to enable vertical movement of the key clamp 50. The second key clamp motor 52 may be configured to cause the key clamp 50 to move in the vertical dimension. The third set of rails 531-533 may be arranged to enable movement of the key clamp 50 in the depth dimension. The third key clamp motor 53 may be configured to cause the key clamp 50 to move in the depth dimension.

The key cutting instruments 73-76 are configured to cut a key blank 100, 110 in order to replicate an existing key. It should be understood that one or more of the key cutting instruments 73-76 may be used to cut a key blank 100, 110. For example, a key blank 100, 110 may be cut to replicate an existing key using one of the key cutting instruments 73-76. In order to replicate an existing key, different types of key cutting instruments 73-76 may be required to cut a key blank 100, 110. The key cutting instruments 73-76 may comprise a milling module 73, one or more cutting blades 74, 75, and/or a deburrer 76. The cutting blades 74, 75 and/or the deburrer 76 may be rotational cutting instruments. The first cutting motor 71 is coupled to at least one of the one or more key cutting instruments 74-76 via a drive belt, as best seen in FIG. 4C. The first cutting motor 71 is arranged to drive at least one of the one or more key cutting instruments 74-76. The second cutting motor 72 is coupled to and arranged to drive cutting elements in the milling module 73.

Figure 5:
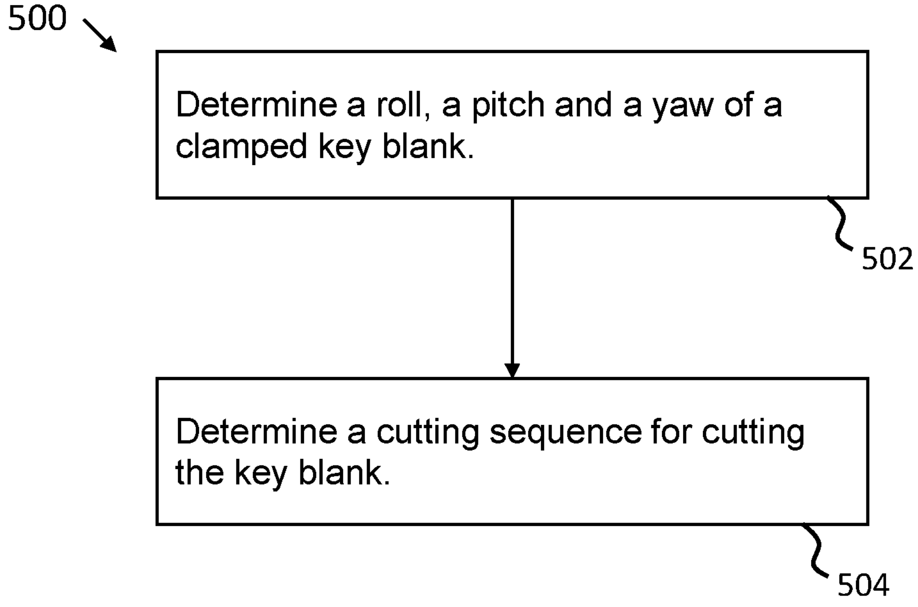
FIG. 5 illustrates an example method for determining a cutting sequence for cutting a key blank.

FIG. 5 illustrates an example method 500 for determining a cutting sequence for cutting a key blank 100, 110. The method 500 may, for example, be carried out by the apparatus 200 illustrated in FIG. 2 and/or the apparatus 10 illustrated in FIG. 3 and as described above.

Figure 6:
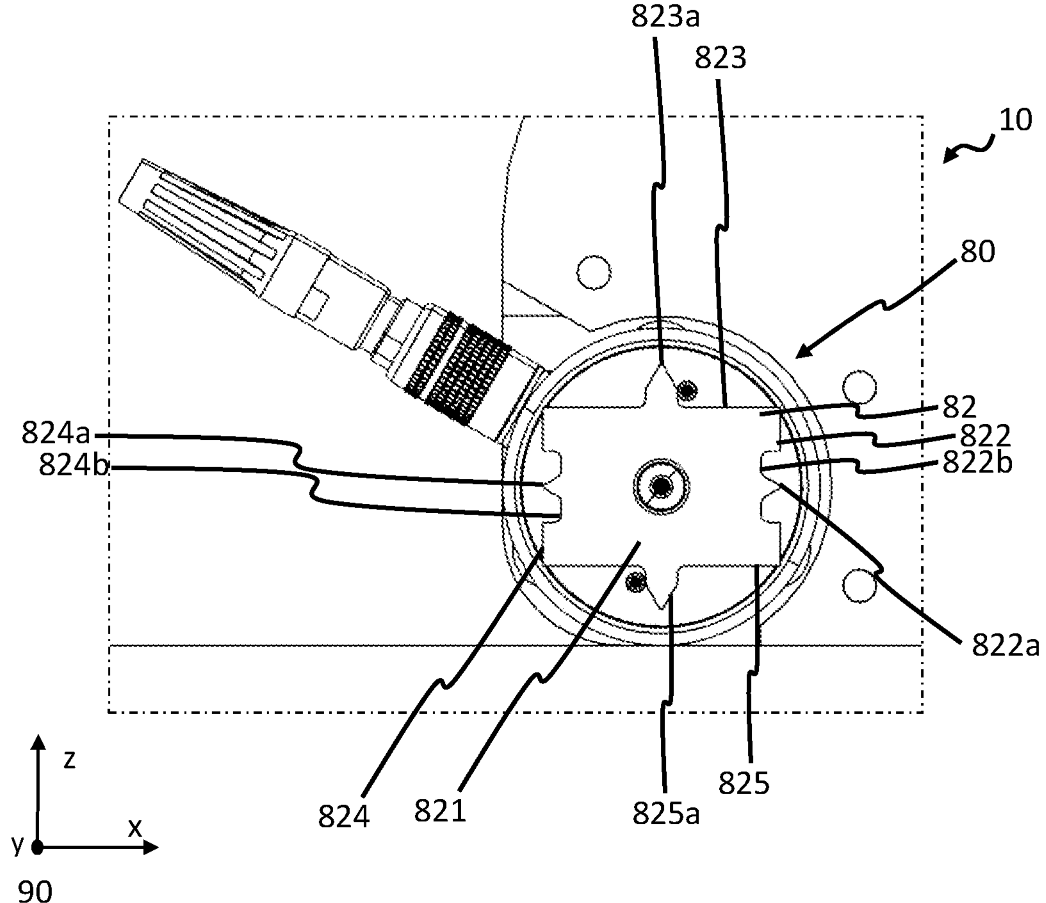
FIG. 6 illustrates a front view of the probe of the key cutting machine.

The method 500 comprises act 502 in which a roll, a pitch and a yaw of a clamped key blank 100, 110 is determined. As explained above in relation to FIG. 3, the key cutting machine 10 may comprise an encoder 80. The encoder 80 may be used to determine the roll, pitch and yaw of the clamped key blank 100, 110. An example of the encoder 80 is illustrated in FIG. 6, in the form of a resistive encoder 80. The resistive encoder 80 can also be seen in the illustration of the key cutting machine in FIG. 4D.

The resistive encoder 80 comprises a probe 82. FIG. 6 shows a front view of an example probe 82 of the key cutting machine 10. The probe 82 comprises a first surface 821, a second surface 822, a third surface 823, a fourth surface 824 and a fifth surface 825.

The first surface 821 may be generally planar. As shown in FIG. 6, the first surface 821 defines a plane parallel to the width dimension and the height dimension of the key cutting machine 10.

As shown in FIG. 6, at least part of the second surface 822 and the fourth surface 824 is substantially parallel with the height dimension. At least part of the third surface 823 and the fifth surface 825 is substantially parallel with the width dimension.

Each surface 821-825 may comprise at least one protrusion and/or at least one recess. As shown in FIG. 6, each of the second, third, fourth and fifth surfaces 822-825 comprise a protrusion 822*a*-825*a* and the second and fourth surfaces 822, 824 each comprise a recess 822*b*, 822*d*.

When determining the roll of a clamped key blank 100, 110 in act 502 of the method 500 illustrated in FIG. 5, the clamped key blank 100, 110 and the probe 82 are moved relative to one another such that the clamped key blank 100, 110 and the third surface 823 of the probe 82 contact each other at two or more locations of the key blank 100, 110 that are spaced in the width dimension. For example, the key clamp 50 may move relative to the probe 82 such that a key blank 100, 110 (retained by the key clamp 50) contacts the third surface 823 of the probe 82 in two or more locations on the key blank 100, 110 that are spaced in the width dimension. In some examples, the two or more locations may be on the blade 104, 114 of the clamped key blank 100, 110. The two or more locations may be on the lower surface 122 of the blade 104, 114 of the clamped key blank 100, 110. The clamped key blank 100, 110 may contact the third surface 823 of the probe 82 at a tip of the protrusion 823*a*. The inventor has found that contacting a protrusion of the probe 82 enables a more accurate location of the clamped key blank 100, 110 to be determined than when using other parts of the third surface 823.

When determining the pitch of a clamped key blank 100, 110 in act 502 of the method 500 illustrated in FIG. 5, the clamped key blank 100, 110 and the probe 82 are moved relative to one another such that the clamped key blank 100, 110 and the second surface 822 of the probe 82 contact each other at two or more locations of the key blank 100, 110 that are spaced in the height dimension. For example, the key clamp 50 may move relative to the probe 82 such that a key blank 100, 110 (retained by the key clamp 50) contacts the third surface 823 of the probe 82 in two or more locations on the key blank 100, 110 that are spaced in the height dimension. In some examples, the two or more locations may be on the blade 104, 114 of the clamped key blank 100, 110. The two or more locations may be on the lower surface 122 of the blade 104, 114 of the clamped key blank 100, 110.

When determining the yaw of a clamped key blank 100, 110 in act 502 of the method 500 illustrated in FIG. 5, the clamped key blank 100, 110 and the probe 82 are moved relative to one another such that the clamped key blank 100, 110 and the second surface 822 of the probe 82 contact each other at two or more locations of the key blank 100, 110 that are spaced in the length dimension. For example, the key clamp 50 may move relative to the probe 82 such that a key blank 100, 110 (retained by the key clamp 50) contacts the second surface 822 of the probe 82 in two or more locations on the key blank 100, 110 that are spaced in the length dimension. In some examples, the two or more locations may be on the blade 104, 114 of the clamped key blank 100, 110. The two or more locations may be on the second side surface 124 of the blade 104, 114 of the clamped key blank 100, 110.

Based on the two or more contacts made in relation to each of the length, width and height dimensions, the encoder 80 may generate orientation data of the clamped key blank 100, 110. The processor 202 may determine the roll, pitch and yaw of the clamped key blank 100, 110 based on the orientation data. For example, the location of the probe 82 and/or the key clamp 50 may be known when the two or more contacts are made. Additionally or alternatively, the length of the clamped key blank 100, 110 may be known when the two or more contacts are made. For example, the processor 202 may determine the roll of the clamped key blank 100, 110 based on the difference between the two or more locations of the clamped key blank 100, 110 in the height dimension. For example, the processor 202 may determine the pitch of the clamped key blank 100, 110 based on the difference between the two or more locations of the clamped key blank 100, 110 in the height dimension. For example, the processor 202 may determine the yaw of the clamped key blank 100, 110 based on the difference between the two or more locations of the clamped key blank 100, 110 in the width dimension.

Upon generating orientation data for each of the roll, pitch and/or yaw of a clamped key blank 100, 110, if the processor 202 determines that the difference between two or more determined locations is greater than a threshold amount then the two or more determined locations may be measured again and/or rejected. For example, when determining the yaw of a clamped key blank 100, 110, the two or more locations may differ from each other in an angle relative to the length dimension. If the angle is greater than a threshold angle, the two or more locations may be determined again and/or rejected. The threshold may be in the range of 1.5 to 2 degrees. The threshold may be in the range of 1.7 to 1.8 degrees. The threshold may be 1.75 degrees.

In some examples, the order in which the roll, pitch and yaw are determined may be used to adjust how the others of the roll, pitch and yaw are determined. For example, a first of roll, pitch or yaw may be determined. Subsequently, a second of roll, pitch and yaw that is different from the first may be determined based on the determined first of roll, pitch or yaw. Subsequently, a third of roll, pitch and yaw that is different from the first and second may be determined based on the determined first and second of roll, pitch or yaw.

For example, the yaw may be determined first, the pitch second and the roll third. In response to determining the yaw, the two or more locations of the key blank 100, 110 that are spaced in the height dimension (used for determining the pitch of the clamped key blank 100, 110) may be adjusted based on the determined yaw of the clamped key blank 100, 110. The pitch may be determined based on the adjusted two or more locations.

In response to determining the yaw and the pitch of the clamped key blank 100, 110, the two or more locations of the key blank 100, 110 that are spaced in the width dimension (used for determining the roll of the clamped key blank 100, 110) may be adjusted based on the determined yaw and pitch of the clamped key blank 100, 110.

It should be understood that the order in which the roll, pitch and yaw are determined may be any suitable order.

It should be understood that determining two or more locations can be achieved using a variety of methods. For example, the two or more locations may be determined by one or more of an optical encoder 80, a magnetic encoder 80 and a resistive encoder 80.

The method of FIG. 5 further comprises step 504 which comprises determining a cutting sequence for cutting the key blank 100, 110 based at least in part on the determined roll, pitch and yaw of the key blank 100, 110. For example, the processor 202 may determine a cutting code 211 comprising the location and/or extent of cuts. Based on the determined roll, pitch and yaw of the clamped key blank 100, 110, the location and/or the extent of the cuts in the cutting code 211 may be adjusted. Adjusting the location and/or the extent of the cuts based on the roll, pitch and yaw of a clamped key blank 100, 110 improves the accuracy of the resultant cut in the clamped key blank 100, 110. For example, key cutting machine 10 may be cut on the assumption that the blade of the clamped key blank 100, 110 is aligned with one or more of the length, width and height dimensions of the key cutting machine 10.

For example, prior to cutting a dimple key 1100 as shown in FIG. 1D, a cutting code 211 for cutting a dimple key blank 110 may comprise, for each spacing of the dimple key blank 110, a location of the dimple and an extent of the dimple. Based on the determined roll, pitch and yaw of the clamped dimple key blank 110, the location of each dimple and extent of each dimple may be adjusted. The dimple key blank 110 may be cut based on the adjusted location and extent of each dimple (i.e., rather than the original cutting code 211).

Prior to cutting a high security key 1000 as shown in FIG. 1E, a cutting code 211 for cutting a high security key blank 100 may comprise, for each spacing of the high security key blank 110, a location of the cut(s) and an extent of the cut(s). Based on the determined roll, pitch and yaw of the clamped high security key blank 100, the location and/or the extent of each cut may be adjusted. The high security key blank 100 may be cut based on the adjusted location and extent of each cut (i.e., rather than the original cutting code 211).

In some examples, the order in which the roll, pitch and yaw are determined may correspond with the order in which the cutting extent(s) and/or location(s) are adjusted. For example, a first of roll, pitch or yaw may be determined. Subsequently, a second of roll, pitch and yaw that is different from the first may be determined. Subsequently, a third of roll, pitch and yaw that is different from the first and second may be determined. After determining the roll, pitch and yaw (e.g., the first, second and third above), the cutting extent(s) and/or the location(s) may be adjusted based on the determined third, subsequently based on the determined second and finally based on the determined first. For example, the first may be the yaw, the second may be the pitch and the third may be the roll. In this example, the cutting extent(s) and/or location(s) may be adjusted firstly based on the roll, secondly on the pitch and thirdly on the yaw. Adjusting the cutting extent(s) and location(s) in the opposite order to which they are determined can improve the accuracy of the resultant cutting sequence.

Figure 7:
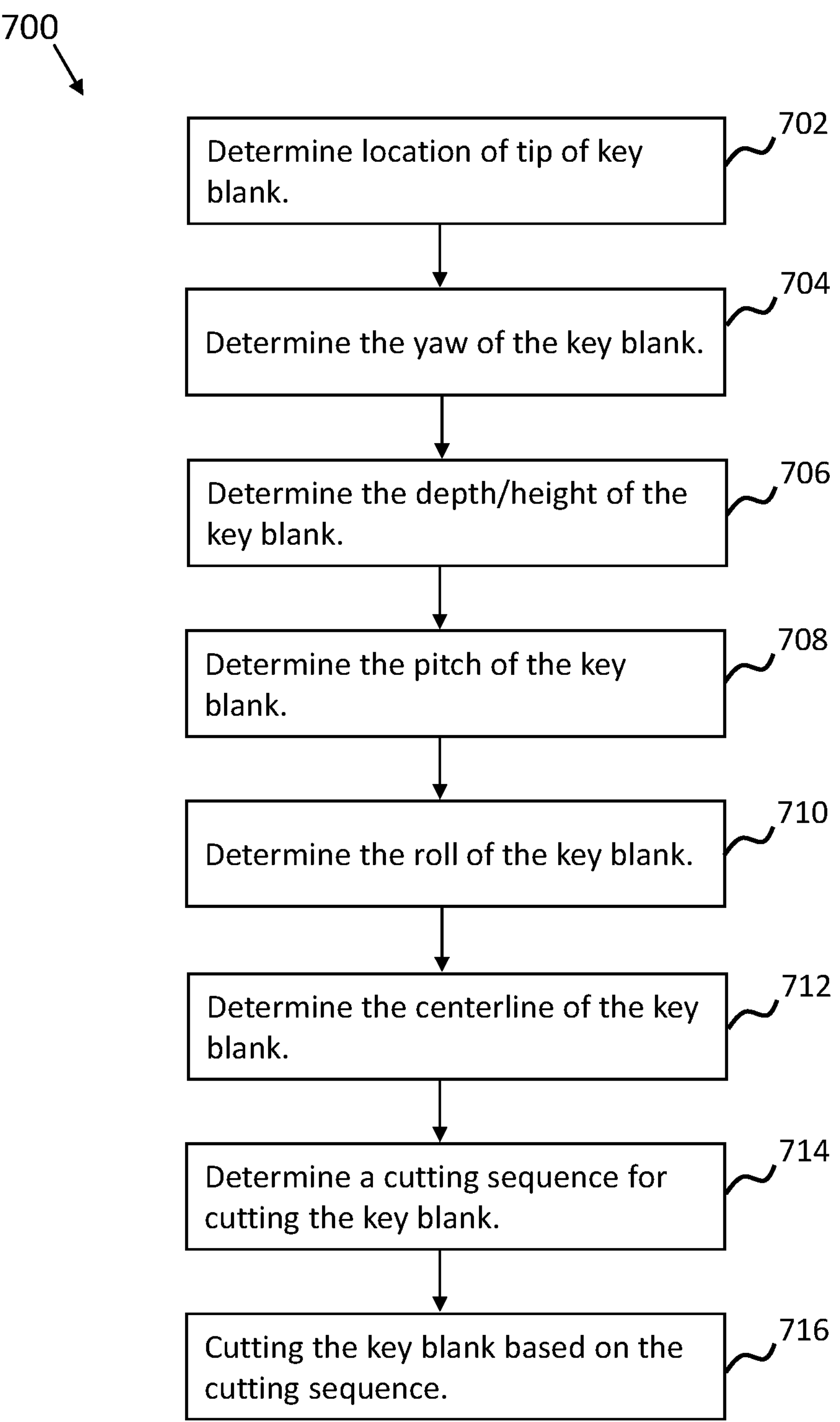
FIG. 7 illustrates an example method for determining a cutting sequence for cutting a key blank.

FIG. 7 illustrates an example method 700 for determining a cutting sequence for cutting a key blank 100, 110. The method 700 may, for example, be carried out by the apparatus 200 illustrated in FIG. 2 and/or the apparatus 10 illustrated in FIG. 3 and as described above.

The method 700 comprises act 702 in which the location of the tip of the clamped key blank 100, 110 is determined. As explained above in relation to FIG. 3, the key cutting machine 10 may comprise an encoder 80. The encoder 80 may be used to determine the location of the tip of the clamped key blank 100, 110.

In an example in which the encoder 80 is a resistive encoder 80, the clamped key blank 100, 110 and the probe 82 of the resistive encoder 80 are moved relative to one another such that the tip of the clamped key blank 100, 110 and the first surface 821 of the probe 82 contact each other. Determining the location of the tip of the clamped key blank 100, 110 may enable the processor 202 to optimize future contact locations when determining the orientation of the clamped key blank 100, 110. For example, if the location of the tip of the clamped key blank 100, 110 is determined and the length of the key blank 100, 110 are determined (e.g., via scanning the key blank 100, 110 and/or user inputs), the spacing of the two or more contacts in each dimension (when determining the roll, pitch and yaw) can be increased. If there are defects in the clamped key blank 100, 110 such as cavities in the clamped key blank 100, 110 or debris on the clamped key blade 100, 110, increasing the distance between the contacts in a dimension can help to reduce the loss of accuracy when determining the orientation of the clamped key blank 100, 110 caused by the defects in the clamped key blank 100, 110.

In some examples, if the location of the tip of the clamped key blank 100, 110 cannot be determined at act 702 (e.g., by the processor 202), the method 700 may be aborted and the key blank 100, 110 may be re-clamped by the key clamp 50. Once the key blank 100, 110 is re-clamped, the method 700 may re-start.

The method 700 comprises act 704 in which a yaw of the clamped key blank 100, 110 is determined. The yaw may be determined in the same manner as described as in relation to block 502 of the method 500 of FIG. 5. As described above, the two or more locations spaced in the length dimension at which the clamped key blank 100, 110 contacts the probe 82 may be determined at least in part on the determined location of the tip of the clamped key blank 100, 110 and/or the determined length of the clamped key blank 100, 110.

The method 700 comprises act 706 in which the depth/height of the clamped key blank 100, 110 is determined (e.g., the lower surface 122 of the clamped key blank 100, 110 relative to the key cutting machine 10). In an example in which the encoder 80 is a resistive encoder 80, the depth of the clamped key blank 100, 110 may be determined by moving the clamped key blank 100, 110 and the probe 82 relative to one another such that the clamped key blank 100, 110 and the second surface 823 of the probe 82 contact each other at two or more locations of the key blank 100, 110 that are spaced in the length dimension. For example, the key clamp 50 may move relative to the probe 82 such that a key blank 100, 110 (retained by the key clamp 50) contacts the second surface 823 of the probe 82 in two or more locations on the key blank 100, 110 that are spaced in the length dimension.

In some examples, the determined location of the lower surface 122 of the clamped key blank 100, 110 relative to the key cutting machine 10 may be used by the processor 202 in determining the two or more locations used in act 708 of the method 700. Additionally or alternatively, the determined location of the lower surface 122 of the clamped key blank 100, 110 relative to the key cutting machine 10 may be used by the processor 202 to determine a location the tip of the clamped key blank 100, 110.

The method 700 comprises act 708 in which a pitch of the clamped key blank 100, 110 is determined. The pitch may be determined in the same manner as described as in relation to block 502 of the method 500 of FIG. 5. As described above, the two or more locations spaced in the length dimension at which the clamped key blank 100, 110 contacts the probe 82 may be determined at least in part on the determined location of the tip of the clamped key blank 100, 110, the determined yaw of the clamped key blank 100, 110 and/or the determined length of the clamped key blank 100, 110.

The method 700 comprises act 710 in which a roll of the clamped key blank 100, 110 is determined. The roll may be determined in the same manner as described as in relation to block 502 of the method 500 of FIG. 5. As described above, the two or more locations spaced in the width dimension at which the clamped key blank 100, 110 contacts the probe 82 may be determined at least in part on the determined location of the tip of the clamped key blank 100, 110, the determined yaw of the clamped key blank 100, 110, the determined pitch of the clamped key blank 100, 110 and/or a determined width of the clamped key blank 100, 110.

The method 700 comprises act 712 in which a centerline of the clamped key blank 100, 110 is determined. The centerline may be a line that extends parallel to the length of the blade 104, 114 of the clamped key blank 100,110 and extends along the center of the upper surface 116 and the first side surface 123 of the clamped key blank 100, 110. Determining the centerline of the clamped key blank 100, 110 may comprise determining two or more locations on the second side surface 124 of the clamped key blank 100, 110 spaced in the length dimension and/or determining one or more locations of the upper surface 106, 116 of the clamped key blank 100, 110 spaced in the length dimension. The centerline may be determined at least in part on the determined one or more locations in the length dimension. Additionally and alternatively, the centerline may be determined using two or more of the locations determined in one or more of the acts 702, 704, 706, 708 and 710 and/or the dimension of the clamped key blank 100, 110.

The two or more locations on the second side surface 124 of the clamped key blank 100, 110 may be used (e.g., by the processor 202) to determine the yaw of the clamped key blank 100, 110. Additionally or alternatively, determining two or more locations on the second side surface 124 of the clamped key blank 100, 110 spaced in the length dimension may be used to verify the yaw determined in act 704. For example, if the determined yaw in act 704 is determined to differ from the determined yaw in act 712 by more than a threshold amount the determined yaw values may be rejected and/or determined again. If the if the determined yaw in act 704 is determined to differ from the determined yaw in act 712 by less than a threshold amount, the yaw determined in act 704 is considered to be sufficiently accurate. The threshold may be in the range of 1.5 to 2 degrees. The threshold may be in the range of 1.7 to 1.8 degrees. The threshold may be 1.75 degrees.

Additionally or alternatively, the determined one or more locations of the upper surface 106, 116 of the clamped key blank 100, 110 may be used to determine the depth/height of the clamped key blank 100, 110 and/or the center of the tip of the clamped key blank 100, 110 in the vertical dimension may be determined. For example, the determined one or more locations of the upper surface 106, 116 of the clamped key blank 100, 110 may be used in combination with locations determined in act 706 to determine the depth/height of the clamped key blank 100, 110 and/or the center of the tip of the clamped key blank 100, 110 in the vertical dimension may be determined. In some examples, the depth/height may be the depth/height of the blade 106, 116 of the clamped key blank 100, 110.

In an example, in which the encoder 80 is a resistive encoder 80, determining two or more locations on the second side surface 124 of the clamped key blank 100, 110 in the length dimension may comprise moving the clamped key blank 100, 110 and the probe 82 relative to one another such that the clamped key blank 100, 110 and the fourth surface 824 of the probe 82 contact each other at two or more locations of the second side surface 124 of the key blank 100, 110 that are spaced in the length dimension. Determining two or more locations on the upper surface 106, 116 of the clamped key blank 100, 110 in the length dimension may comprise moving the clamped key blank 100, 110 and the probe 82 relative to one another such that the clamped key blank 100, 110 and the third surface 823 of the probe 82 contact each other at two or more locations of the upper surface 106, 116 of the key blank 100, 110 that are spaced in the length dimension.

The method 700 comprises act 714 in which a cutting sequence for cutting the clamped key blank 100, 110 is determined. The cutting sequence may be determined in the same manner as described as in relation to block 504 of the method 500 of FIG. 5.

The method 700 comprises act 716 in which the clamped key blank 100, 110 is cut based on the determined cutting sequence. The cutting sequence may be cut using one or more of the key cutting instruments 73-76 (i.e., at least one cutter) described above. For example, the processor 202 may cause at least one cutter to cut the clamped key blank 100, 110 in accordance with the determined cutting sequence.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Where a structural feature has been described, it may be replaced by means for performing one or more of the functions of the structural feature whether that function or those functions are explicitly or implicitly described.

References to 'computer-readable storage medium', 'computer program product', 'tangibly embodied computer program' etc. or a 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in the accompanying FIGS. may represent steps in a method, such as the methods shown in FIGS. 5 and 7, and/or sections of code in the computer program 206. The illustration of a particular order to the blocks does not necessarily imply that there is a required or preferred order for the blocks and the order and arrangement of the block may be varied. Furthermore, it may be possible for some blocks to be omitted.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the applicant may seek protection via the claims in respect of any patentable feature or combination of features hereinbefore referred to and/or shown in the drawings whether or not emphasis has been placed thereon.

I claim:

1. An apparatus comprising:

a probe;

at least one processor; and at least one memory including computer program code configured to, with the at least one processor, cause the apparatus at least to:

cause the probe to contact a first surface of a blade of a clamped key blank in two or more locations that are spaced in a first dimension in a reference frame of the apparatus, the reference frame having the first dimension, a second dimension and a third dimension, wherein the first surface is defined by a length and a depth of the blade of the clamped key blank;

based at least in part on the determined two or more locations that are spaced in the first dimension, determine a yaw of the clamped key blank, wherein the yaw represents an orientation in the third dimension in the reference frame of the apparatus;

cause the probe to contact a second surface of the blade of the clamped key blank in two or more locations that are spaced in the second dimension in the reference frame of the apparatus, wherein the second surface is defined by the length and a width of the blade of the clamped key blank;

based at least in part on the determined two or more locations that are spaced in the second dimension, determine a roll of the clamped key blank, wherein the roll represents an orientation about the first dimension in the reference frame of the apparatus;

cause the probe to contact the second surface of the blade of the clamped key blank in two or more locations that are spaced in the third dimension in the reference frame of the apparatus;

based at least in part on the determined two or more locations that are spaced in the third dimension, determine a pitch of the clamped key blank, wherein the pitch represents an orientation about the second dimension in the reference frame of the apparatus; and determine a cutting sequence for cutting the clamped key blank, by at least:

determining a cutting code comprising at least one cut and at least one of: (i) a location of the at least one cut; and (ii) a cutting extent of the at least one cut; and adjusting, based at least in part on the determined roll, pitch and yaw of the clamped key blank, the location and/or cutting extent of the at least one cut.

2. The apparatus of claim 1, wherein the computer program code is configured to, with the at least one processor, further cause the apparatus at least to:

cause at least one cutter to cut the clamped key blank in accordance with the determined cutting sequence.

3. The apparatus of claim 1, wherein the computer program code is configured to, with the at least one processor, cause the apparatus at least to:

determine a first of roll, pitch or yaw;

determine a second of roll, pitch or yaw that is different from the first;

determine a third of roll, pitch or yaw that is different from the first and second; and after determining the roll, pitch and yaw, adjust the cutting extent based on the determined third, subsequently based on the determined second and finally based on the determined first.

4. The apparatus of claim 3, wherein the first is the yaw, the second is the pitch and the third is the roll.

5. The apparatus of claim 1, wherein the apparatus is a key cutting machine comprising the at least one cutter and a key clamp for clamping the clamped key blank.

6. The apparatus of claim 1, wherein the probe has a first surface and a second surface perpendicular to the first surface.

7. The apparatus of claim 6, wherein the first surface is parallel with the second dimension and the second surface is parallel with the third dimension.

8. The apparatus of claim 6, wherein the computer program code is configured to, with the at least one processor, cause the apparatus at least to:

cause the first surface of the probe to contact the first surface of the blade of the clamped key blank in two or more locations that are spaced in the first dimension;

cause the second surface of the probe to contact the second surface of the blade of the clamped key blank in two or more locations that are spaced in the second dimension; and cause the second surface of the probe to contact the second surface of the blade of the clamped key blank in two or more locations that are spaced in the third dimension.

9. The apparatus of claim 8, wherein the probe comprises one or more protrusions, and wherein the computer program code is configured to, with the at least one processor, cause the apparatus at least to:

cause a tip of a protrusion, of the one or more protrusions, on the second surface of the probe to contact the second surface of the blade of the clamped key blank in two or more locations that are spaced in the second dimension.

10. The apparatus of claim 6, wherein the probe has a planar surface different from the first surface and the second surface.

11. The apparatus of claim 10, wherein the planar surface defines a plane parallel to the second dimension and the third dimension.

12. The apparatus of claim 10, wherein the computer program code is configured to, with the at least one processor, cause the apparatus at least to:

cause the planar surface of the probe to contact a tip of the clamped key blank.

13. An apparatus comprising:

a probe;

at least one processor; and at least one memory including computer program code configured to, with the at least one processor, cause the apparatus at least to:

cause the probe to contact a tip of a blade of a clamped key blank;

determine a location of the tip of the blade based at least in part on the contact between the probe and the tip of the blade;

cause the probe to contact a first surface of a blade of the clamped key blank in two or more locations that are spaced in a first dimension in a reference frame of the apparatus, the reference frame having the first dimension, a second dimension and a third dimension, wherein the first surface is defined by a length and a depth of the blade of the clamped key blank, and wherein the two or more locations that are spaced in the first dimension are determined based at least in part on the determined location of the tip of the blade;

based at least in part on the determined two or more locations that are spaced in the first dimension, determine a yaw of the clamped key blank, wherein the yaw represents an orientation in the third dimension in the reference frame of the apparatus;

cause the probe to contact a second surface of the blade of the clamped key blank in two or more locations that are spaced in the second dimension in the reference frame of the apparatus, wherein the second surface is defined by the length and a width of the blade of the clamped key blank, and wherein the two or more locations that are spaced in the second dimension are determined based at least in part on the determined location of the tip of the blade;

based at least in part on the determined two or more locations that are spaced in the second dimension, determine a roll of the clamped key blank, wherein the roll represents an orientation about the first dimension in the reference frame of the apparatus;

cause the probe to contact the second surface of the blade of the clamped key blank in two or more locations that are spaced in the third dimension in the reference frame of the apparatus, wherein the two or more locations that are spaced in the third dimension are determined based at least in part on the determined location of the tip of the blade;

based at least in part on the determined two or more locations that are spaced in the third dimension, determine a pitch of the clamped key blank, wherein the pitch represents an orientation about the second dimension in the reference frame of the apparatus; and based at least in part on the determined roll, pitch and yaw of the clamped key blank, determine a cutting sequence for cutting the clamped key blank.

14. The apparatus of claim 13, wherein the probe has a planar surface, and causing the probe to contact a tip of a blade of the clamped key blank comprises causing the planar surface of the probe to contact the tip of the blade.

15. The apparatus of claim 14, wherein the planar surface defines a plane parallel to the second dimension and the third dimension.

16. The apparatus of claim 13, wherein the probe has a first surface and a second surface perpendicular to the first surface.

17. The apparatus of claim 16, wherein the first surface is parallel with the second dimension and the second surface is parallel with the third dimension.

18. The apparatus of claim 17, wherein the computer program code is configured to, with the at least one processor, cause the apparatus at least to:

cause the first surface of the probe to contact the first surface of the blade of the clamped key blank in two or more locations that are spaced in the first dimension;

cause the second surface of the probe to contact the second surface of the blade of the clamped key blank in two or more locations that are spaced in the second dimension; and cause the second surface of the probe to contact the second surface of the blade of the clamped key blank in two or more locations that are spaced in the third dimension.

19. A key cutting apparatus, comprising:

a key clamp configured to clamp a key blank, wherein the clamped key blank comprises a blade having an upper surface, a lower surface, a first side surface and a second side surface, the upper surface being defined by a length and a width of the blade, the lower surface being defined by the length and the width of the blade, the first side surface being defined by the length and a depth of the blade, and the second side surface being defined by the length and the depth of the blade, wherein the length of the blade is greater than the width of the blade and greater than the depth of the blade, and wherein the width of the blade is greater than the depth of the blade;

one or more motors configured to move the key clamp in a first dimension, a second dimension and a third dimension, wherein each of the first dimension, the second dimension and the third dimension are orthogonal to each other;

at least one cutter configured to cut the clamped key blank by cutting into the upper surface of the clamped key blank in a direction aligned with the third dimension;

at least one processor; and at least one memory including computer program code configured to, with the at least one processor, cause the apparatus at least to:

determine a yaw of the clamped key blank wherein the yaw represents an orientation of the clamped key blank about the third dimension;

after determining the yaw of the clamped key blank, determine a pitch of the clamped key blank about the second dimension;

after determining the yaw of the clamped key blank, determine a roll of the clamped key blank about the first dimension;

based at least in part on the determined roll, pitch and yaw of the clamped key blank, determine a cutting sequence for cutting the key blank; and cause the at least one cutter to cut into the upper surface of the clamped key blank in accordance with the determined sequence.

* * * * *